US012561300B1

(12) United States Patent
Kong et al.

(10) Patent No.: US 12,561,300 B1
(45) Date of Patent: Feb. 24, 2026

(54) AUTOMATIC SCALING FOR TARGETED SWEEP

(71) Applicant: Palantir Technologies Inc., Denver, CO (US)

(72) Inventors: Jeremy Kong, London (GB); Mohammed Daudali, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 19/033,400

(22) Filed: Jan. 21, 2025

Related U.S. Application Data

(60) Provisional application No. 63/724,045, filed on Nov. 22, 2024.

(51) Int. Cl.
*G06F 16/215* (2019.01)
*G06F 16/23* (2019.01)

(52) U.S. Cl.
CPC ........ *G06F 16/215* (2019.01); *G06F 16/2322* (2019.01)

(58) Field of Classification Search
None
See application file for complete search history.

(56) References Cited

U.S. PATENT DOCUMENTS

| | | | | |
|---|---|---|---|---|
| 5,991,779 A | * | 11/1999 | Bejar .................. | G06F 12/0269 |
| 7,757,214 B1 | * | 7/2010 | Palczak ................. | G06F 9/5083 |
| | | | | 717/121 |
| 7,937,419 B2 | * | 5/2011 | Ylonen ............... | G06F 12/0253 |
| | | | | 707/813 |
| 8,631,219 B2 | * | 1/2014 | Thomas .................. | G06F 9/455 |
| | | | | 718/100 |
| 8,886,691 B2 | * | 11/2014 | Colgrove .............. | G06F 3/0608 |
| | | | | 707/820 |
| 12,182,106 B2 | | 12/2024 | Maretic et al. | |

* cited by examiner

*Primary Examiner* — Amresh Singh
(74) *Attorney, Agent, or Firm* — Duane Morris LLP

(57) ABSTRACT

A system for scaling parallelism in sweeping stale data associated with multi-version data management is disclosed. The system is programmed to manage a targeted sweep of stale data stored on distributed storage associated with a set of computing nodes, where the stale data includes metadata for database transactions. The system is programmed to dynamically determine, on a computing node, how many threads to simultaneously perform deletion for the targeted sweep based on historical performance of the computing nodes, historical performance of the distributed storage associated with the computing nodes, or other factors. The system is programmed to then cause a certain number of threads to run on the computing node, where each thread identifies and deletes specific metadata for data transactions within the scope of the targeted sweep.

20 Claims, 5 Drawing Sheets

100

Computer Application Server

102

Network

118

Computing Node

130

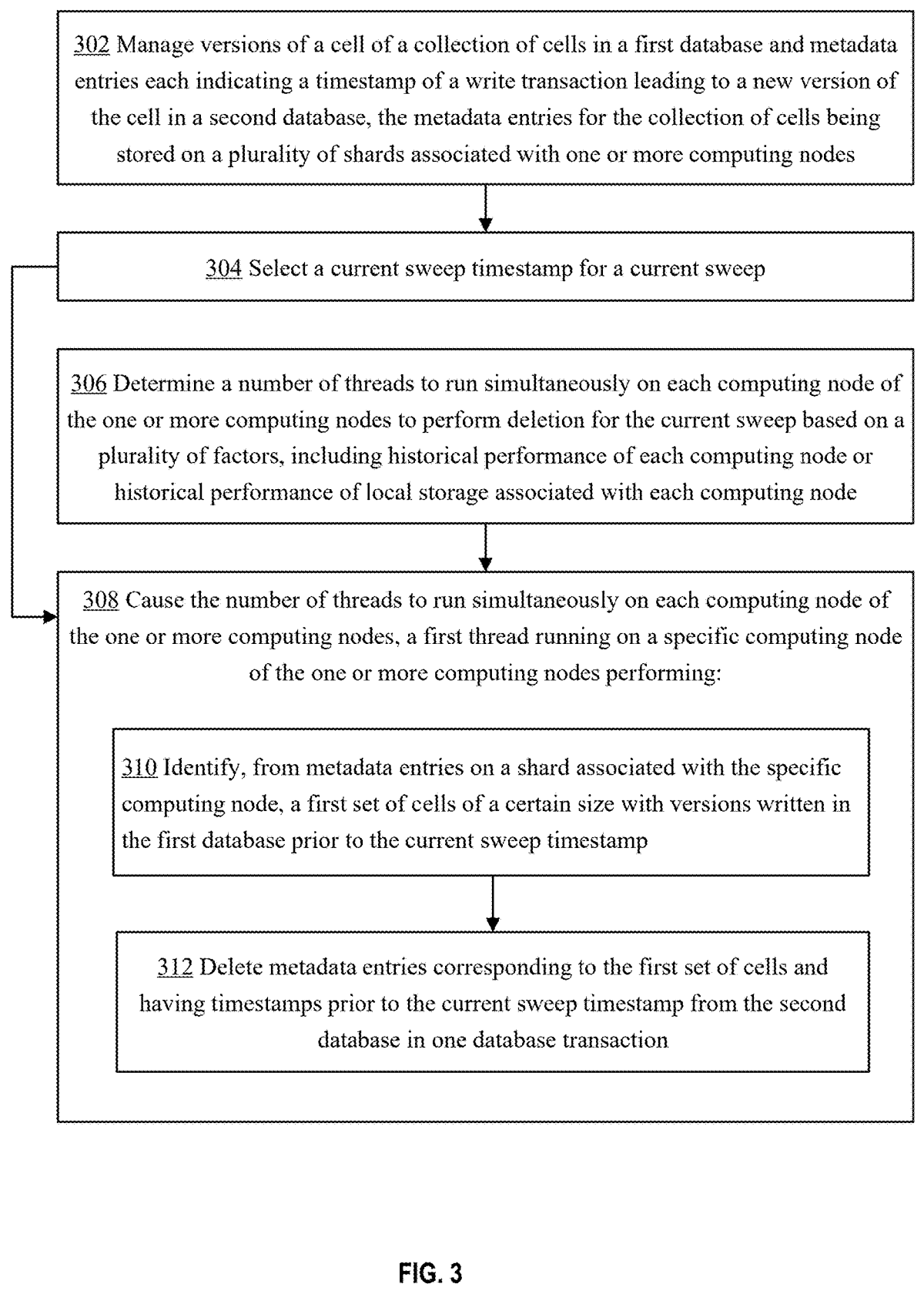

302 Manage versions of a cell of a collection of cells in a first database and metadata entries each indicating a timestamp of a write transaction leading to a new version of the cell in a second database, the metadata entries for the collection of cells being stored on a plurality of shards associated with one or more computing nodes 304 Select a current sweep timestamp for a current sweep 306 Determine a number of threads to run simultaneously on each computing node of the one or more computing nodes to perform deletion for the current sweep based on a plurality of factors, including historical performance of each computing node or historical performance of local storage associated with each computing node 308 Cause the number of threads to run simultaneously on each computing node of the one or more computing nodes, a first thread running on a specific computing node of the one or more computing nodes performing:

310 Identify, from metadata entries on a shard associated with the specific computing node, a first set of cells of a certain size with versions written in the first database prior to the current sweep timestamp 312 Delete metadata entries corresponding to the first set of cells and having timestamps prior to the current sweep timestamp from the second database in one database transaction

FIG. 3

AUTOMATIC SCALING FOR TARGETED SWEEP

RELATED APPLICATIONS

This application claims the benefit under 35 U.S.C. § 119(e) of U.S. Provisional Application No. 63/724,045, titled "AUTOMATIC SCALING FOR TARGETED SWEEP" and filed on Nov. 22, 2024, the entire contents of which are hereby incorporated by reference as if fully set forth herein. This application is related to co-pending U.S. patent application Ser. No. 18/211,403, titled "TARGETED SWEEP METHOD FOR KEY-VALUE DATA STORAGE" and filed on Jun. 19, 2023, the entire contents of which are incorporated by reference as if fully set forth herein.

TECHNICAL FIELD

The present disclosure relates to database management, and more particularly to maintaining data versions and performing deletion of stale versions.

BACKGROUND

In some data management solutions, new versions of data are stored separately without overwriting old versions, which can reduce database access contention and have other advantages. However, maintaining different versions continuously increases storage requirements, which can get out of control. Therefore, such a solution generally has a mechanism for removing stale versions of data, once it is safe to do so. There are cases where this mechanism must wait, such as long running transactions or database unavailability, thus it is possible that the mechanism falls behind. When users store large amounts of short-lived data, the mechanism also suffers from excessive memory and disk usage and other performance degradation. It would be helpful to have an improved mechanism that performs deletion efficiently.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 3 illustrates a process of scaling parallelism in sweeping stale data associated with multi-version data management in accordance with disclosed embodiments.

DETAILED DESCRIPTION OF CERTAIN EMBODIMENTS

Figure 1:
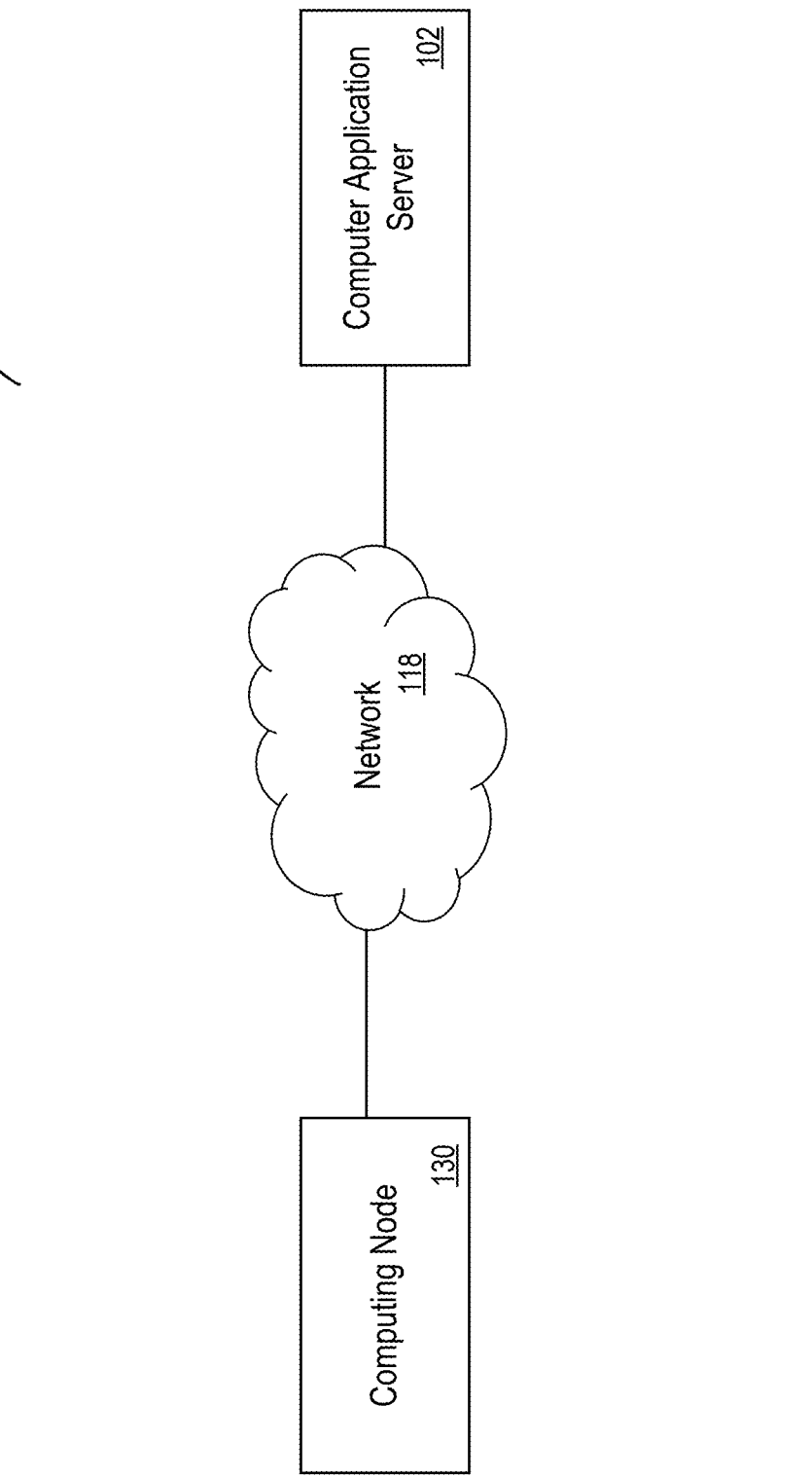
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for scaling parallelism in sweeping stale data associated with multi-version data management is disclosed. The system is programmed to manage a targeted sweep of stale data stored on distributed storage associated with a set of computing nodes, where the stale data includes metadata for database transactions. The system is programmed to dynamically determine, on a computing node, how many threads to simultaneously perform deletion for the targeted sweep based on historical performance of the computing nodes, historical performance of the distributed storage associated with the computing nodes, or other factors. The system is programmed to then cause a certain number of threads to run on the computing node, where each thread identifies and deletes specific metadata for data transactions within the scope of the targeted sweep.

In some embodiments, a system is programmed to coordinate operation of a set of computing nodes in a distributed environment, each associated with a local storage device, which can be divided into fine partitions. The system is programmed to distribute database tasks among the computing nodes, causing the computing nodes to perform database transactions on data cells and store metadata for the database transactions in the local storage devices. The metadata includes timestamps indicating when database transaction are performed.

In some embodiments, the system is programmed to manage a targeted sweep to delete stale data written prior to a specific time. The stale data generally includes the data cells as well as the associated metadata. The system can be programmed to determine the specific time based on a start timestamp of a longest running write transaction or an earliest readable time. The system is programmed to increase when possible the number of threads that perform deletion for the targeted sweep simultaneously on each computing node, as stale data written prior to the specific time can be deleted in any order rather than the order in which it was written. The system can be programmed to delete stale data in an order that may not match the order in which the stale data was written, to facilitate a higher degree of parallelism.

In some embodiments, the system is programmed to dynamically determine the number of threads to run on a computing node based on a variety of factors, such as the quantity of resources (e.g., processor power or input/output bandwidth) currently accessible to each computing node for sweep purposes, the historical sweep performance (e.g., quantity of resources used per unit of time or amount of time required per unit of task) of each computing node, the historical sweep performance of each local node, the total number of live computing nodes, or the total amount of deletion yet to be performed.

In some embodiments, the system is programmed to receive regular updates from each computing node related to the health of the computing node, the quantity of resources currently accessible to the computing node, the amount of deletion remaining to be performed by the computing node, or other aspects of the targeted sweep. The system is programmed to adjust the number of threads running on each computing nodes based on the updates, including increasing the number of threads on one or more computing nodes to take over the deletion originally to be performed by another computing node that is no longer operational.

In some embodiments, each thread can repeatedly identify a set of data cells in one or more fine partitions from the metadata for the target sweep, delete versions of the set of data cells that fall in the sweep range, and delete the metadata associated with those versions.

In some embodiments, the system is programmed to reduce the total number of attempted deletions performed by the threads across the set of computing nodes. Specifically, after receiving information regarding the sets of data cells identified by the threads, the system is programmed to set up a graph where each node represents a set of data cells and each edge represents two sets covering one or more common data cells. It generally suffices for one thread to perform deletion data related to all version of a specific data cell at once, instead of having to separately delete multiple stale version in any specific order. Therefore, the system can be programmed to then approximate a maximum independent set of the graph to avoid repeated attempts to delete common data cells or associated metadata.

The system disclosed herein has several technical benefits. Performing a targeted sweep to delete stale data associated with multi-version data management certainly releases storage space and lessens memory requirement, while retaining the benefits of maintaining multiple versions of data. By regularly determining an appropriate sweep period, the system enables the stale data to be deleted as soon as possible. Instead of writing data into queues to enable data to be deleted in the order in which it was written, which limits the maximum parallelism at write time to the number of queues, by dynamically (after write time) increasing or decreasing the number of threads running on each computing node, the system helps improve the total throughput for the targeted sweep and avoid serious delays. By determining an approximation of a maximum independent set, the system can reduce the number of attempted deletes performed by the threads for the targeted sweep.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer application server ("server") 102 and a computing node 130 or more computing nodes, which are communicatively coupled through direct physical connections or via a network 118.

In some embodiments, the computing node 130 is programmed or configured to manage local storage and run one or more threads to perform various tasks, such as read or write transactions on data saved in the local storage or a central storage managed by the server 102. The computing node 130 is also programmed to communicate with the server 102 to help perform tasks that require cooperation of computing nodes, which can include accessing external storage associated with another computing node with appropriate permission. The computing node 130 can comprise any computing facility with sufficient computing power in data processing, data storage, and network communication for performing the above-mentioned functions. The computing node can be similar to the server 102, as further discussed below, or comprise a personal computing device, such as s desktop computer, laptop computer, tablet computer, smartphone, or wearable device.

In some embodiments, the server 102 is programmed or configured to manage a distributed environment comprising the computing node 130 or other computing nodes. Specifically, the server 102 is programmed to manage a first database that stores data, including different versions generated via write transactions, and a second database that stores metadata associated with the data, such as timestamps or user identifiers of the write transactions. The server 102 can be configured to have the first database and the second database hosted in a combination of the central storage and the local storage. The server 102 is programmed to further manage tasks to be performed against the first database and the second database by coordinating with the one or more computing nodes. The tasks can include writing new versions of the data and corresponding metadata as well as removing stale versions of the data. In certain embodiments, the server 102 can include a computing node. The server 102 can comprise any centralized or distributed computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed to coordinate with one or more computing nodes including the computing node 130 to write versions of data into the first database and corresponding metadata into the second database. Upon user request or according to a specific schedule, the server 102 is programmed to further coordinate with one or more computing nodes to remove stale versions of the data from the first database and corresponding metadata from the second database in a targeted sweep. The coordination includes continuously receiving information from the computing nodes regarding the availability of local resources. This coordination further includes transmitting a command having various parameters to each computing node to perform deletion for the targeted sweep, the parameters including the amount of deletion to perform on the local storage and the amount of local resources to use for the sweep. In addition, the coordination includes continuously receiving a status update of the deletion from each computing node.

3. Functional Descriptions

3.1. Managing Multiple Versions of Cells

In some embodiments, the server 102 is programmed to store data in a databases (a "cell database" hereinafter), such as a key-value store (KVS) of cells. Each key of a cell could have a row index and a column index or any other cell identifier. The value associated with a key may change over time through write transactions, and different versions of the value can all be saved as distinct entries in the cell database under multiversion concurrency control (MVCC). The server 102 is programmed to further store metadata of write transactions, such as a timestamp indicating when a write transaction was performed, in a database (a "metadata database" hereinafter). For example, the metadata database could be implemented as a queue given the temporal nature of the data. In general, for a write command, the server 102 can be configured to issue a commit to the cell database, thus obtaining a timestamp for the write transaction, add an entry to the metadata database based on the timestamp, and persist the written value into the cell database.

In some embodiments, the server 102 is programmed to coordinate with one or more computing nodes. The server 102 could be configured to distribute the metadata database over multiple shards associated with multiple computing nodes. For example, a shard can be part of a local storage managed by a computing node. The portion of the metadata database that is implemented by one shard could be further partitioned based on a static or dynamic partition size. For example, each fine partition can be defined by a fixed number of metadata entries. Alternatively, the portion could be divided into fine partitions for a fine partition size that covers 50,000 units of time (or other metadata), which means that entries having timestamps that fall in the range of 0 to 49,999 belongs to the first fine partition, entries having timestamps that fall in the range of 50,000 to 99,999 belongs to the second fine partition, and so on.

Figure 2A:
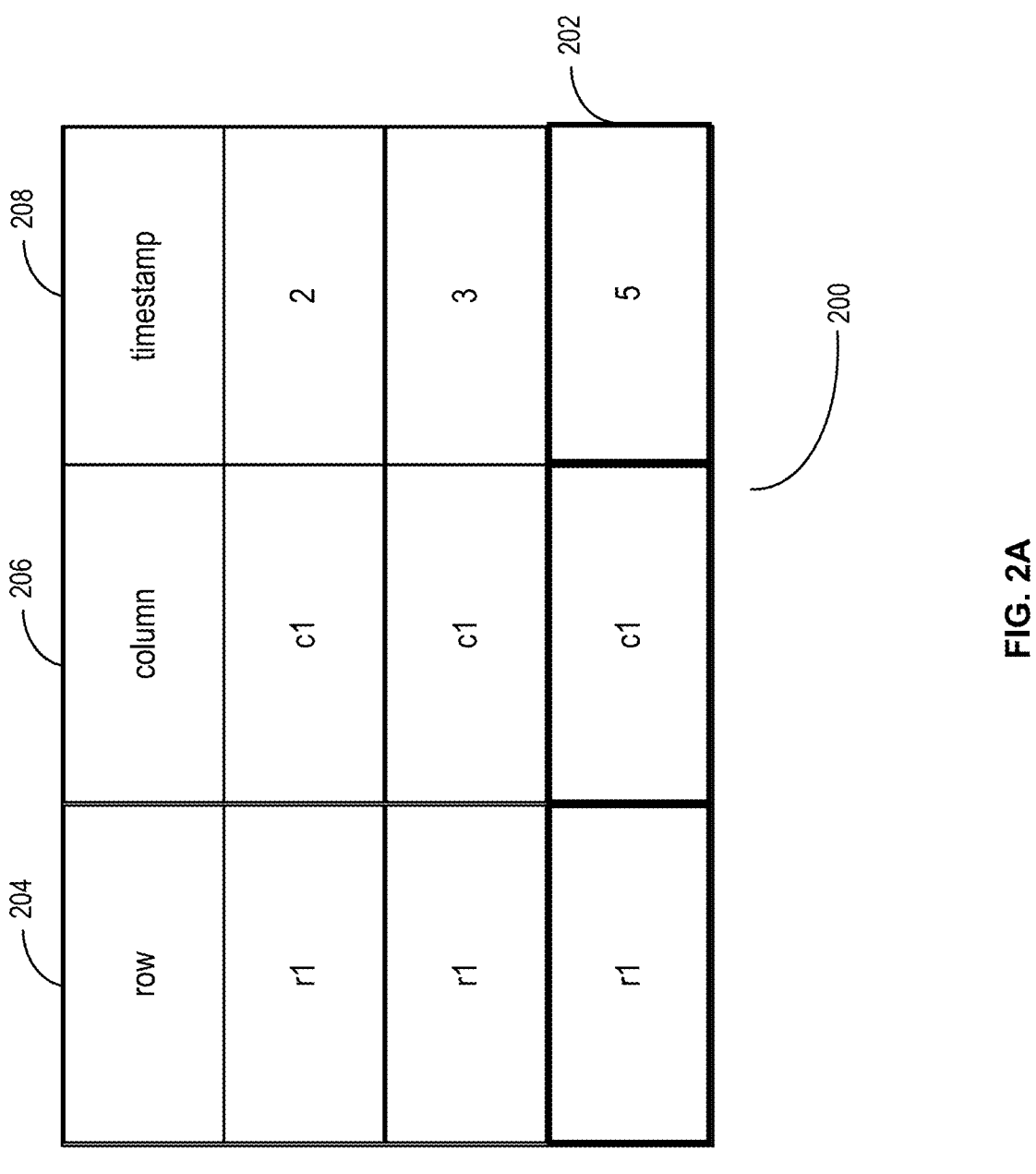
FIG. 2A illustrates an example metadata database table (or view) holding metadata for cell transactions.

FIG. 2A illustrates an example metadata database table (or view) holding metadata for cell transactions. A metadata database table stores metadata for each transaction performed on a cell, such as the timestamp for each write transaction. Each row, such as the row 202 of the table 200, could store the cell key in terms of a row index and a column index and a corresponding timestamp in three separate columns, such as the columns 204, 206, and 208. Such a metadata database table can be easily queried to view or delete a list of rows having timestamps before a sweep timestamp of the current sweep, as further discussed below. The metadata database table could also be implemented by storing data on different fine partitions or shards.

Figure 2B:
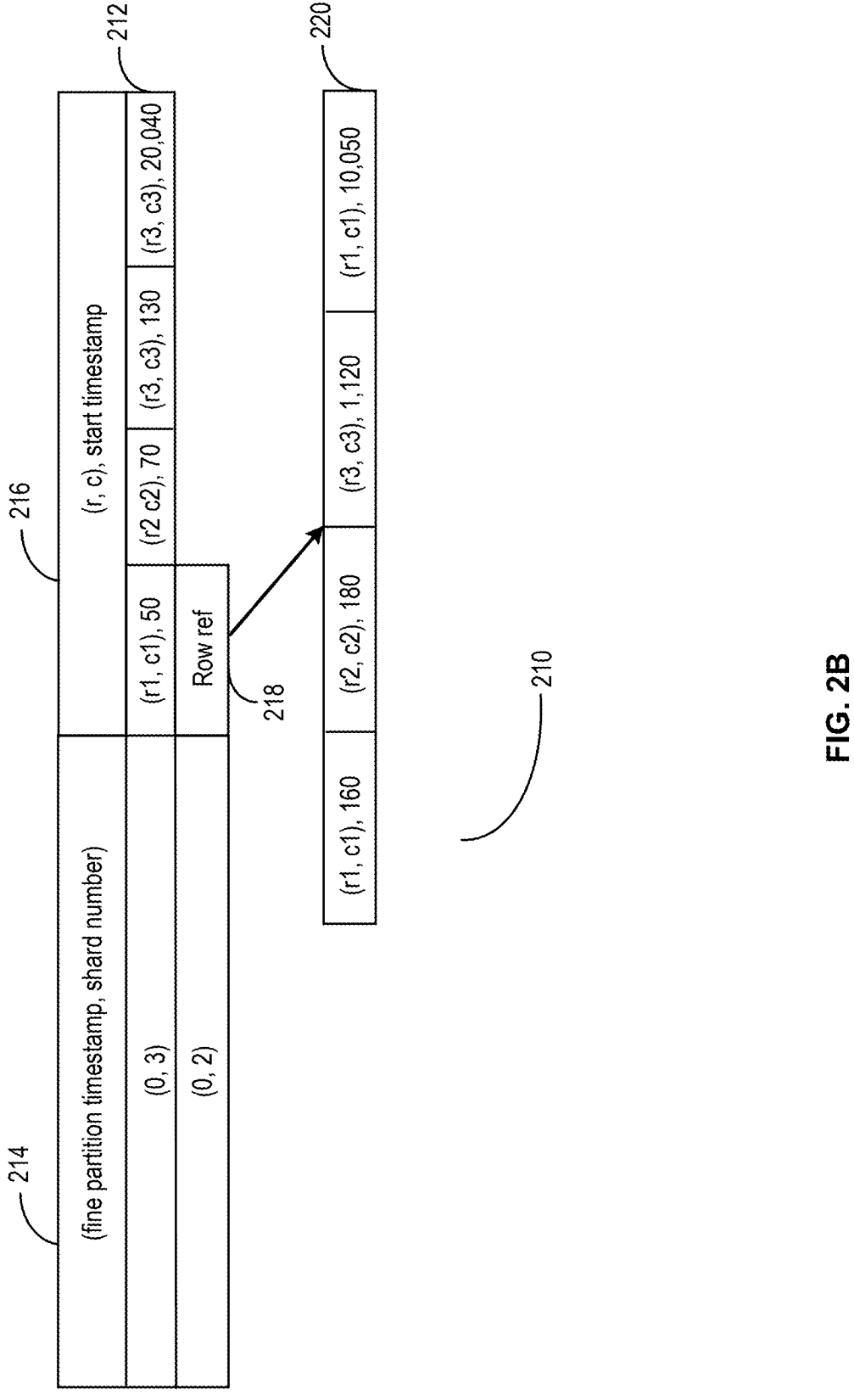
FIG. 2B illustrates another example metadata database table holding metadata for cell transactions.

FIG. 2B illustrates another example metadata database table holding metadata for cell transactions. A metadata database table can be organized by storage, and this table 210 organizes metadata by shards and fine partitions. Each row, such as the row 212, could store the storage key in terms of the shard number or fine partition number in one column, such as the column 214. Each row could also store the list of metadata entries, each similar to a row in the table 200, in one column, such as the column 216. More specifically, since the number of metadata entries could change dynamically, this column could be implemented to contain a reference, such as the entry 218, to a list, such as 220, where the list could be implemented as set of rows in another database table, such as the table 200.

In some embodiments, the server 102 is programmed to receive updates from each computing node according to a schedule. An update can be a performance update indicating latest performance metrics for the computing node or the associated local storage. An update can also be a resource availability update indicating the quantity of resources currently accessible to the computing node. The server 102 can be programmed to determine when a computing node is considered to have missed an update and assign a dead or broken status to the computing node.

3.2. Determining Number of Threads

In some embodiments, the server 102 is programmed to delete metadata entries and corresponding cell versions that are no longer in use in a sweep to free up storage and accelerate searches of such cell data or metadata. As noted above, the server 102 can be programmed to coordinate with one or more computing nodes to carry out the sweep. The server 102 can be programmed to first identify a sweep timestamp indicating the end of a stale period using existing techniques and perform a targeted sweep of data associated with that stale period. For example, the sweep timestamp can be the lower of a start timestamp of a longest running write transaction (nothing before that timestamp should change) or an earliest readable time (no read transaction can see any data with a timestamp earlier than that time).

To maintain transactional functionality, historical versions of the cell under consideration are deleted before the corresponding metadata entries for that cell are removed. In this way, if a computing node goes offline or the processing is somehow interrupted, the sweep can still be performed at a later time, and a cell version will not be passed over due to its metadata entry being removed before the cell version has been deleted. In addition to having different computing nodes perform deletion simultaneously across different shards, the server 102 is programmed to increase parallelism by enabling different threads running on each computing node to perform deletion simultaneously across different fine partitions of a shard.

In some embodiments, for each sweep, the server 102 is programmed to first identify a set of fine partitions having metadata entries that fall in the current sweep range, which starts from the sweep timestamp of the last sweep to the sweep timestamp of the current sweep. All metadata entries in the set of fine partitions that fall in the current sweep range can be deleted, so these entries can be processed out of order. Therefore, the server 102 is programmed to determine the number of threads to be running on each computing node such that all the threads running on all the computing nodes could perform deletion simultaneously. The server 102 can be programmed to start with a given total number of threads, which can be limited by the intended quantity of resources to be devoted to each sweep, divided by the current total number of live computing nodes to obtain an initial number of threads per computing node. The server 102 can be programmed to then automatically adjust or scale the number of threads for each computing node depending on various factors, such as the quantity of resources (e.g., processor power or input/output bandwidth) currently accessible to each computing node for sweep purposes, the historical sweep performance (e.g., quantity of resources used per unit of time or amount of time required per unit of task) of each computing node, the historical sweep performance of each local node (at the node, shard, coarse partition, fine partition, or other level), the total number of live computing nodes, or the total amount of deletion yet to be performed.

In some embodiments, the server 102 is programmed to keep the number of threads running on a computing node relatively large when the quantity of resources currently accessible to the computing node is relatively large, the historical sweep performance of the computing node is relatively high, the historical performance of the local storage to be accessed by the computing node is relatively high, the total number of live computing nodes is relatively small, or the total amount of deletion yet to be performed is relatively large. Similarly, the server 102 is programmed to keep the number of threads running on a computing node can be relatively small when the quantity of resources currently accessible to the computing node is relatively small, the historical sweep performance of the computing node is relatively low, the historical performance of the local storage to be accessed by the computing node is relatively low, the total number of live computing nodes is relatively large, or the total amount of deletion yet to be performed is relatively small. The server 102 can be programmed to determine how to assess the different factors together by assigning specific weights to the different factors or by using existing machine learning techniques, such as regression methods or artificial neural networks, to determine how the different factors as different features can be related to one another in contributing to the number of threads for a computing node to perform deletion for a sweep.

In other embodiments, each computing nodes could be configured to automatically scale the number of threads running locally based on local information specific to the computing node. Each computing nodes can be configured to make further adjustments based on global information applicable across the computing nodes received from the server 102.

In some embodiments, the server 102 is programmed to instruct threads to perform the deletion associated with the full set of cells that have been collected, or an adjusted set of cells to reduce the total number of deletes, as further discussed in Section 3.4. Without the adjustments, each thread can also directly perform the deletion once its set of cells is collected.

3.3. Identifying Sweepable Cells Per Thread

In some embodiments, a thread running on each computing node collects a configurable-sized set of cells for one sweep by reviewing the set of fine partitions associated with the computing node that fall in the current sweep range, according to some strategy. One strategy is to always review the available fine partition that has the smallest fine partition index, which can have the earliest metadata entries. Another strategy is to review the fine partition that has the smallest fine partition index when that fine partition is available and otherwise review a random fine partition. Since multiple threads can be operating at the same time, the thread can acquire a lock on a fine partition to make it unavailable before reviewing the fine partition and release the lock when the review is complete. Depending on the size of each fine partition, the thread can collect the metadata entries from one or more fine partitions. A thread can also collect the metadata entries from fine partitions of different shards. To review each fine partition, the thread can access a metadata database organized by fine partitions, such as the one illustrated in FIG. 2B, index a row based on the fine partition index, and examine each metadata entry in the one or more columns.

In some embodiments, the thread counts the number of cells collected by merging multiple metadata entries associated with the same cell. For example, there can be a first metadata entry for a cell C (C, T1) and a second metadata entry (C, T2) in a fine partition, where T2>T1. Since deleting the second metadata entry is associated with deleting prior versions of C written up to T2, which include prior versions of C written up to T1, and prior versions written prior to a specific timestamp can generally be removed with one delete (in a single write transaction), the thread counts the cell C just once despite two metadata entries in achieving a specifically sized workload for each delete.

In some embodiments, the server 102 can be configured to keep track of the progress within each fine partition during the current sweep based on feedback from each thread. This allows any thread to continue collecting the set of cells from where a previous thread left off. The progress can be expressed in terms of the range of metadata entries that are already covered in a sweep. For example, a first fine partition may have 800 ordered metadata entries, while a second fine partition may have 350 ordered metadata entries. When the configurable threshold is 250, a sweep can eventually cover metadata entries 501 through 750 in the first fine partition, or it can cover metadata entries 701 through 800 in the first fine partition and metadata entries 1-150 in the second fine partition.

3.4. Reducing Total Number of Deletes Across Threads

In some embodiments, the server 102 is programmed to evaluate the sets of cells collected by different threads for the current sweep and adjust the sets to reduce the total number of deletes performed. For example, a first set of cells collected by a first thread can include a first metadata entry (C, T1), while a second set of cells collected by a second thread can include a second entry (C, T2), where T2>T1. Deleting data stored in a location can involve releasing space at that location from the current pool, placing a deletion marker in the space to indicate no useable value, or other appropriate actions. Since deleting the entry with T2 is associated with deleting prior versions of C written prior to T2, which include prior versions of C written prior to T1, it is redundant for the first thread to separately delete the prior versions of C written prior to T1.

In some embodiments, the server 102 can be programmed to track, based on the feedback from the threads noted above, which set of cells has the largest timestamp for each cell covered in the sets of cells and what that largest timestamp is. The server 102 can be programmed to then affect the deletion from the other sets of cells. More specifically, the server 102 can be programmed to track, based on feedback from the threads, a group of cells that needs to be swept at a given point in time as well as the timestamps at which deletion is desired. The server 102 can be programmed to then identify the highest timestamp for each cell covered in the sets of cells. The server 102 can be programmed to then select specific threads out of the different threads for the current sweep or create a new assignment of sets of cells to the different threads, to perform the deletion up to the highest timestamp for each cell covered in the sets of cells. The selection of threads or new assignment of sets of cells can be based on various factors, such as (clock) time, information about how data is distributed, or user configuration. This approach improves storage usage by performing fewer deletes, the relative value of which vary depending on the aspects of the computing environment.

4. Example Processes

FIG. 3 illustrates a process of scaling parallelism in sweeping stale data associated with multi-version data management in accordance with disclosed embodiments. FIG. 3 is shown in simplified, schematic format for purposes of illustrating a clear example and other embodiments may include more, fewer, or different elements connected in various manners. FIG. 3 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 302, the server 102 is programmed to manage versions of a cell of a collection of cells in a first database and metadata entries each indicating a timestamp of a write transaction leading to a new version of the cell in a second database. The metadata entries for the collection of cells is stored on a plurality of shards associated with one or more computing nodes.

In step 304, the server 102 is programmed to select a current sweep timestamp for a current sweep. In some embodiments, the current sweep timestamp is a lower of a start timestamp of a longest running write transaction and an earliest readable time.

In step 306, the server 102 is programmed to determine a number of threads to run simultaneously on each computing node of the one or more computing nodes to perform deletion for the current sweep based on a plurality of factors, including historical performance of each computing node or historical performance of local storage associated with each computing node. This step has no dependence on steps 302 and 304 and can be performed any time before step 308.

In some embodiments, the server 102 is programmed to determine the number of threads by starting with dividing a given total number of threads by a number of live computing nodes. In certain embodiments, the server 102 is programmed to determine the number of threads based on a quantity of resources currently accessible to each computing node for sweep purposes, a total number of live computing nodes, or a total amount of deletion yet to be performed for the current sweep.

In step 308, the server 102 is programmed to cause the number of threads to run simultaneously on each computing node of the one or more computing nodes. A first thread running on a specific computing node of the one or more computing nodes then, in step 310, identifies from metadata entries on a shard associated with the specific computing node, a first set of cells of a certain size with versions written in the first database prior to the current sweep timestamp, and, in step 312, deletes metadata entries corresponding to the first set of cells and having timestamps prior to the current sweep timestamp from the second database in one database transaction.

In some embodiments, the certain size is a predetermined number of metadata entries or a number of metadata entries having timestamps falling in a period of a predetermined length. In certain embodiments, in identifying the first set of cells, the first thread counts a specific cell only once towards the first set of cells when at least one metadata entry for the specific cell each having a timestamp less than the current sweep timestamp is encountered.

In some embodiments, in deleting the metadata entries, the first thread removes versions of a cell written prior to the current sweep timestamp from the first database before removing corresponding metadata entries from the second database.

In some embodiments, a portion of the shard associated with the specific computing node is divided into one or more fine partitions, and each fine partition is represented as a row in a table having a first column for an index of the fine partition and a second column for a list of metadata entries. In identifying the first set of cells, the first thread then retrieves a specific row from the table and reviewing columns of the row. In certain embodiments, the server 102 is programmed to receive information regarding the first set of cells provided by the first thread, and record coverage of a fine partition of the one or more fine partitions by the first set of cells based on the information. A second thread running on the specific computing node the identifies, from the shard associated with the specific computing node, a second set of cells with versions written in the first database prior to the current sweep timestamp based on the coverage.

In some embodiments, the server 102 is programmed to receive a periodic performance update related to a computing node or an associated local storage or a periodic resource availability update indicating a quantity of resources accessible from the computing node.

In some embodiments, the server 102 is programmed to determine that a first computing node of the one or more computing nodes is no longer alive, and adjust the number of threads to run on a second computing node of the one or more computing nodes that is still alive to perform deletion for the current sweep without waiting for the first computing node to be alive again.

In some embodiments, a second thread running on a certain computing node of the one or more computing nodes performing identifies a second set of cells with versions written in the first database prior to the current sweep timestamp. In causing the number of threads to run simultaneously, the server 102 is programmed to evaluate all sets of cells collected by the respective numbers of threads running on the one or more computing nodes. The server 102 is programmed to then determine the first set of cells intersecting with the second set of cells. In addition, the server 102 is programmed to instruct the second thread not to perform deletion based on the second set of cells.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
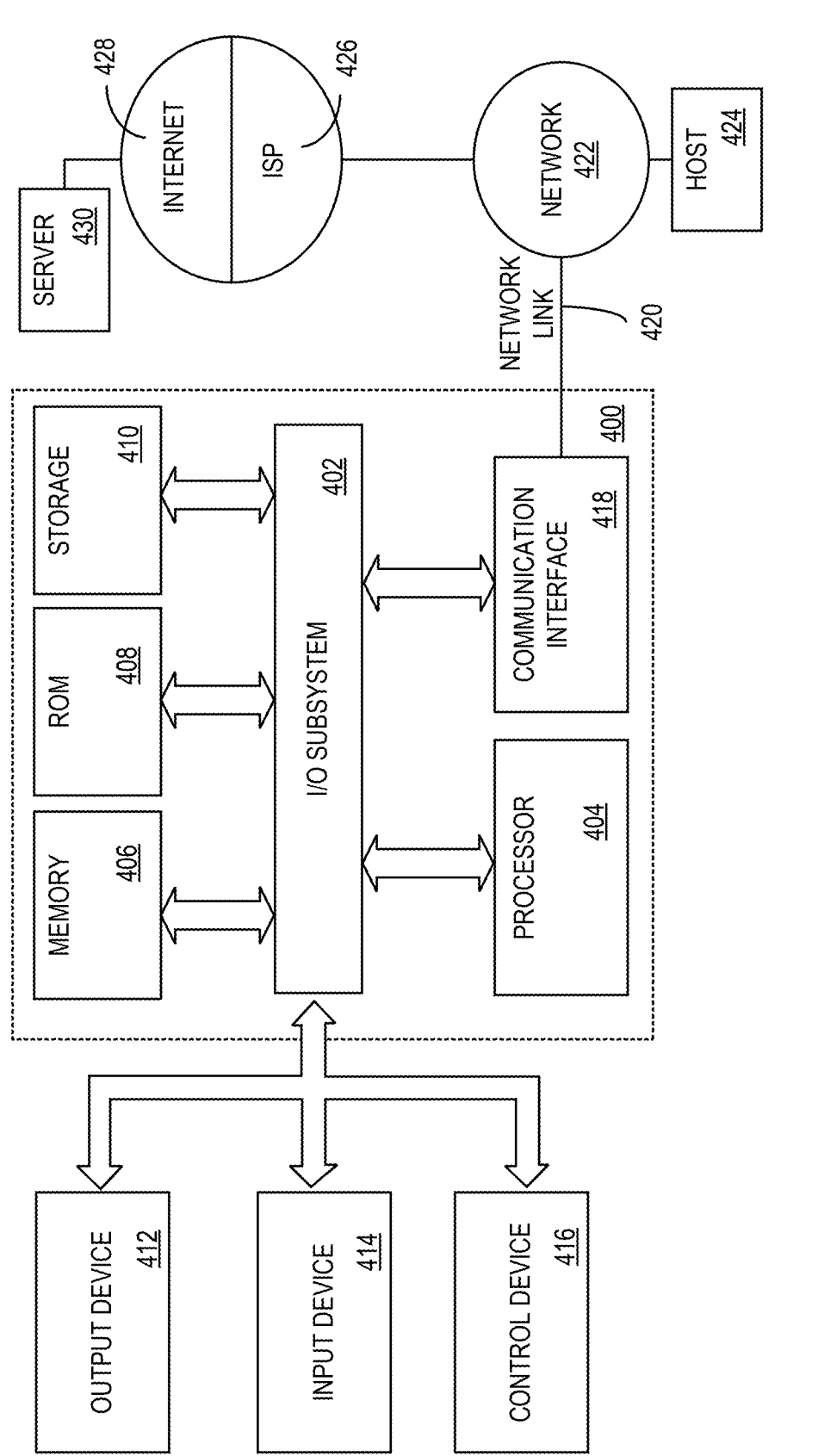
FIG. 4 illustrates an example computer system upon which various embodiments may be implemented.

FIG. 4 illustrates an example computer system upon which various embodiments may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as flash memory, or solid-state storage, magnetic disk, or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators, or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on the output device 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host computer 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to I/O subsystem 402. Communication interface 418 provides a two-way data communication coupling to network link(s) 420 that are directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a LAN, WAN, campus network, internetwork, or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server 430 may be coupled to internet 428. Server 430 broadly represents any computer, data center, virtual machine, or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, Uniform Resource Locator (URL) strings with parameters in HTTP payloads, application programming interface (API) calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using SQL or NoSQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of scaling parallelism in sweeping stale data associated with multi-version data management, comprising:

managing versions of a cell of a collection of cells in a first database and metadata entries each indicating a timestamp of a write transaction leading to a new version of the cell in a second database, the metadata entries for the collection of cells being stored on a plurality of shards associated with one or more computing nodes;

selecting a current sweep timestamp for a current sweep;

determining a number of threads to run simultaneously on each computing node of the one or more computing nodes to perform deletion for the current sweep based on a plurality of factors, including historical performance of each computing node or historical performance of local storage associated with each computing node; and causing the number of threads to run simultaneously on each computing node of the one or more computing nodes, a first thread running on a specific computing node of the one or more computing nodes performing:

identifying, from metadata entries on a shard associated with the specific computing node, a first set of cells of a certain size with versions written in the first database prior to the current sweep timestamp; and deleting metadata entries corresponding to the first set of cells and having timestamps prior to the current sweep timestamp from the second database in one database transaction, wherein the method is performed by one or more processors.

2. The method of claim 1, the current sweep timestamp being a lower of a start timestamp of a longest running write transaction and an earliest readable time.

3. The method of claim 1, the determining starting with dividing a given total number of threads by a number of live computing nodes.

4. The method of claim 1, the determining being further based on a quantity of resources currently accessible to each computing node for sweep purposes, a total number of live computing nodes, or a total amount of deletion yet to be performed for the current sweep.

5. The method of claim 1, the certain size being a predetermined number of metadata entries or a number of metadata entries having timestamps falling in a period of a predetermined length.

6. The method of claim 1, the identifying comprising counting a specific cell only once towards the first set of cells when at least one metadata entry for the specific cell each having a timestamp less than the current sweep timestamp is encountered.

7. The method of claim 1, a portion of the shard associated with the specific computing node being divided into one or more fine partitions, each fine partition being represented as a row in a table having a first column for an index of the fine partition and a second column for a list of metadata entries, the identifying comprising retrieving a specific row from the table and reviewing columns of the row.

8. The method of claim 7, further comprising:

receiving information regarding the first set of cells provided by the first thread;

recording coverage of a fine partition of the one or more fine partitions by the first set of cells based on the information, a second thread running on the specific computing node identifying, from the shard associated with the specific computing node, a second set of cells with versions written in the first database prior to the current sweep timestamp based on the coverage.

9. The method of claim 1, further comprising receiving a periodic performance update related to a computing node or an associated local storage or a periodic resource availability update indicating a quantity of resources accessible from the computing node.

10. The method of claim 1, further comprising:
   determining that a first computing node of the one or more computing nodes is no longer alive;
   adjusting the number of threads to run on a second computing node of the one or more computing nodes that is still alive to perform deletion for the current sweep without waiting for the first computing node to be alive again.

11. The method of claim 1, the deleting further comprising removing versions of a cell written prior to the current sweep timestamp from the first database before removing corresponding metadata entries from the second database.

12. The method of claim 1,
   a second thread running on a certain computing node of the one or more computing nodes performing identifying a second set of cells with versions written in the first database prior to the current sweep timestamp,
   the causing comprising:
   evaluating all sets of cells collected by the respective numbers of threads running on the one or more computing nodes;
   determining the first set of cells intersecting with the second set of cells; and
   instructing the second thread not to perform deletion based on the second set of cells.

13. A system for scaling parallelism in sweeping stale data associated with multi-version data management, comprising:
   a memory;
   one or more processors coupled to the memory and configured to perform:
   managing versions of a cell of a collection of cells in a first database and metadata entries each indicating a timestamp of a write transaction leading to a new version of the cell in a second database,
   the metadata entries for the collection of cells being stored on a plurality of shards associated with one or more computing nodes;
   selecting a current sweep timestamp for a current sweep;
   determining a number of threads to run simultaneously on each computing node of the one or more computing nodes to perform deletion for the current sweep based on a plurality of factors, including historical performance of each computing node or historical performance of local storage associated with each computing node; and
   causing the number of threads to run simultaneously on each computing node of the one or more computing nodes, a first thread running on a specific computing node of the one or more computing nodes performing:
   identifying, from metadata entries on a shard associated with the specific computing node, a first set of cells of a certain size with versions written in the first database prior to the current sweep timestamp; and
   deleting metadata entries corresponding to the first set of cells and having timestamps prior to the current sweep timestamp from the second database in one database transaction.

14. The system of claim 13, the determining starting with dividing a given total number of threads by a number of live computing nodes.

15. The system of claim 13, the determining being further based on a quantity of resources currently accessible to each computing node for sweep purposes, a total number of live computing nodes, or a total amount of deletion yet to be performed for the current sweep.

16. The system of claim 13, the identifying comprising counting a specific cell only once towards the first set of cells when at least one metadata entry for the specific cell each having a timestamp less than the current sweep timestamp is encountered.

17. The system of claim 13,
   a portion of the shard associated with the specific computing node being divided into one or more fine partitions,
   each fine partition being represented as a row in a table having a first column for an index of the fine partition and a second column for a list of metadata entries,
   the identifying comprising retrieving a specific row from the table and reviewing columns of the row.

18. The system of claim 13, the one or more processors being further configured to perform receiving a periodic performance update related to a computing node or an associated local storage or a periodic resource availability update indicating a quantity of resources accessible from the computing node.

19. The system of claim 13, the one or more processors being further configured to perform:
   determining that a first computing node of the one or more computing nodes is no longer alive;
   adjusting the number of threads to run on a second computing node of the one or more computing nodes that is still alive to perform deletion for the current sweep without waiting for the first computing node to be alive again.

20. A non-transitory, computer-readable storage medium storing one or more sequences of instructions which when executed cause one or more processors to perform:
   managing versions of a cell of a collection of cells in a first database and metadata entries each indicating a timestamp of a write transaction leading to a new version of the cell in a second database,
   the metadata entries for the collection of cells being stored on a plurality of shards associated with one or more computing nodes;
   selecting a current sweep timestamp for a current sweep;
   determining a number of threads to run simultaneously on each computing node of the one or more computing nodes to perform deletion for the current sweep based on a plurality of factors, including historical performance of each computing node or historical performance of local storage associated with each computing node; and
   causing the number of threads to run simultaneously on each computing node of the one or more computing nodes, a first thread running on a specific computing node of the one or more computing nodes performing:
   identifying, from metadata entries on a shard associated with the specific computing node, a first set of cells of a certain size with versions written in the first database prior to the current sweep timestamp; and
   deleting metadata entries corresponding to the first set of cells and having timestamps prior to the current sweep timestamp from the second database in one database transaction.

* * * * *